Figure 1:
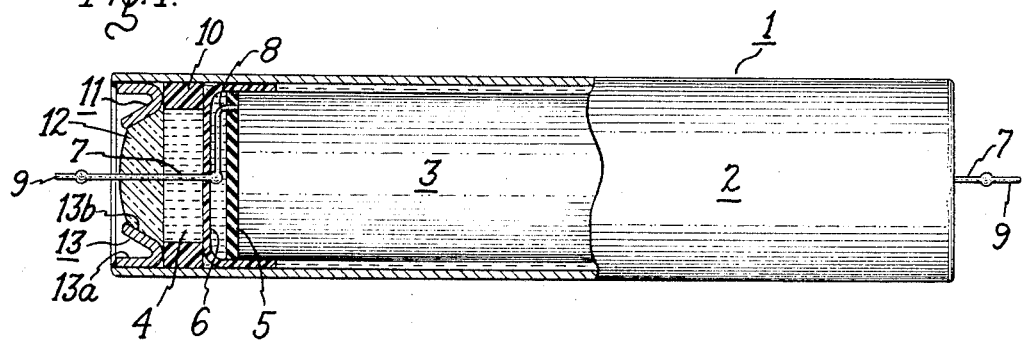

Sept. 27, 1966  R. B. MERRITT ET AL  3,275,901

SEALED ELECTRICAL ASSEMBLY

Filed March 14, 1963

Inventors,
Robert B. Merritt,
Raymond M. Trewhella,
by Sidney Greenberg
Their Attorney.

United States Patent Office 3,275,901
Patented Sept. 27, 1966

3,275,901
SEALED ELECTRICAL ASSEMBLY
Robert B. Merritt, Daytona Beach, Fla., and Raymond M. Trewhella, Irmo, S.C., assignors to General Electric Company, a corporation of New York
Filed Mar. 14, 1963, Ser. No. 265,163
9 Claims. (Cl. 317—230)

The present invention relates to sealed assemblies and more particularly to electrical devices such as electrolytic capacitors having sealed assemblies for containing fluid components therein.

The effective sealing of electrolytic capacitors within a tight enclosure is essential to prevent loss of electrolyte as well as entrance of moisture, air and other contaminants, since such loss or contamination usually leads to variation and degradation of electrical properties of the unit, as well as premature breakdown.

Known types of seals used in the past for electrolytic capacitors have not proved entirely effective for various reasons. For example, difficulties have been encountered in preventing creepage of the electrolyte through the seal along the lead wire, such as that made of tantalum, principally because the seal material did not form an intimate hermetic bond with the lead wire. The occurrence of leakage at this and other regions of the seal presents particular problems in the use of capacitors in such applications as space equipment, where exposure to vacuum conditions and severe temperature variation aggravates the causes of leakage, and where escape of electrolyte vapors may adversely affect the operation of other components in the space equipment.

It is an object of the invention to provide an effective hermetic seal for electrical devices, especially electrolytic capacitors.

It is another object of the invention to provide hermetically sealed electrical assemblies such as electrolytic capacitors wherein leakage of contained liquids such as electrolytes along terminal leads is prevented and vapor transmission through the seal is largely eliminated.

It is a particular object of the invention to provide sealed electrical assemblies of the above type having a glass-metal seal which is readily and economically manufactured, is simple in construction, and occupies a relatively small volume.

Other objects and advantages will become apparent from the following description and the appended claims.

With the above objects in view, the present invention relates, in a preferred embodiment, to a hermetically sealed electrical assembly comprising a casing containing an electrolyte and an electrical component immersed therein, the casing having a terminal lead extending outwardly through an opening in the casing and being composed of a film-forming metal having a dielectric oxide film thereon, and a closure hermetically sealing the casing opening and electrically insulating the terminal lead from the casing, the closure comprising a metal ring member joined to the casing and having glass material retained therein in sealing relation with the ring member and the terminal lead passing therethrough, the glass material and the terminal lead having substantially matching coefficients of thermal expansion, and the ring member having a coefficient of thermal expansion substantially equal to or greater than that of the glass material.

Figure 2:
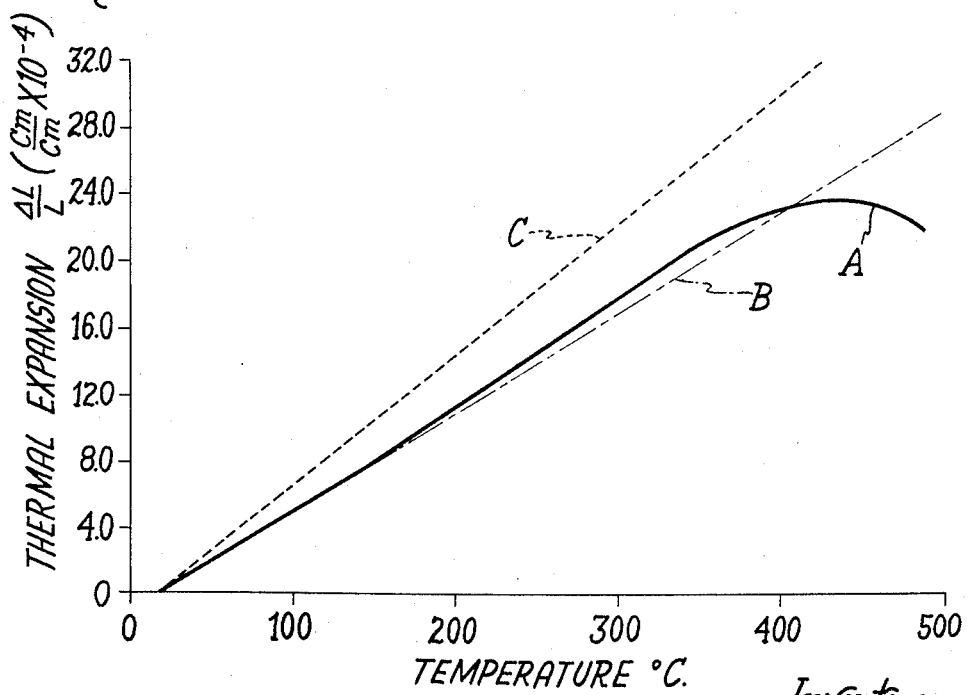

The invention will be better understood from the following description taken in conjunction with the accompanying drawing, in which:

FIGURE 1 is a view partly in section of a preferred embodiment of the invention; and FIGURE 2 is a graphical showing of thermal expansion properties of the components of the glass-metal seal of a preferred embodiment of the invention.

Referring now to the drawing, and particularly to FIGURE 1, there is shown an electrolytic capacitor 1 comprising a metal casing 2 and containing a rolled capacitor section 3 conventionally made of a pair of convolutely wound electrode foils of film-forming metal such as tantalum, niobium or other capacitor electrode metals known in the art, separated by paper or other dielectric spacer material, roll 3 usually being additionally wrapped with dielectric sheet material to electrically insulate it from casing 2. Capacitor section 3 is immersed in and impregnated by liquid electrolyte 4 contained in casing 2. The electrolyte may be of any conventional or known type of capacitor electrolyte, as for example an aqueous ammonium pentaborate-glycol solution or a non-aqueous organic liquid composition or mixture, and it may be of liquid, gel, paste or other form.

In a usual construction, casing 2 is tubular in form with opposite open ends, each end having a hermetic seal, as herein described. The end seal assembly preferably includes an insulating disc 5 adjacent the end of capacitor roll 3 made of a chemically resistant material having low vapor transmission and moisture absorbent characteristics, such as polytetrafluoroethylene (Teflon), for the purpose of protecting the end edges of capacitor roll 3. A cup-shaped end cap 6 made of suitable electrically insulating material such as glass cloth, polyester resin, or the like, fits over the end of capacitor roll 3 and insulating disc 5. Passing through end cap 6 and extending outwardly of casing 2 is terminal lead wire 7, typically composed of tantalum, or other equivalent film-forming metal having similar thermal expansion properties, such as niobium, and having an anodic dielectric oxide film formed thereon, lead wire 7 being welded at its inner end to tap strap 8, which likewise is typically made of tantalum, or the equivalent, joined to the anode electrode foil of capacitor roll 3. At its outer end, terminal lead 7 is welded to an external lead 9, usually composed of a solderable metal such as nickel, copper or the like. If desired, lead wire 7 may be joined directly to the capacitor electrode, thus eliminating tap strap 8.

Neither insulating disc 5 nor end cap 6, which serves to retain lead wire 7 in position to prevent it from coming into contact with metal casing 2, is an essential feature of the invention and may be dispensed with under appropriate conditions. Spacer ring 10 made of a suitable elastomeric material, such as butyl rubber, is advantageously provided between the outer glass-metal seal and end cap 6 as a shock-absorbent member, but is not necessarily employed.

It should also be understood that the glass-metal seal structure described herein could be employed in types of capacitors other than that shown. For example, casing 2 could be of cup-shaped form with an anode of suitable type (such as a wound foil or sintered pellet anode) inserted therein instead of capacitor section 3, the casing serving as the cathode and having a cathode terminal lead suitably secured thereto, all as well known in the art.

In accordance with the invention, capacitor 1 is closed at its end by a glass-metal seal structure 11 which provides a strong, hermetic seal, which is compatible with electrolyte 4, and effectively prevents its escape from within casing 2 even under severe operating conditions of widely varying temperature and pressure. Essentially, seal structure 11 comprises a glass material 12 having the novel composition disclosed in co-pending application Serial No. 265,235—Schonebarger, or Serial No. 265,265—Graff, filed concurrently herewith, and assigned to the same assignee as the present invention. The seal structure further comprises a metal retaining ring 13 having a rim portion 13a which fits closely within the tubular wall of casing 2 and a tapered conical seal surface 13b in which glass material 12 is received and which has an axial opening for passage of lead wire 7 therethrough, as shown, glass 12 being fusion sealed to ring 13 and lead wire 7. Preferably, seal surface portion 13b tapers outwardly so as to ensure retention of glass seal material 12 in position in the event of pressure build-up within casing 2, in which event the tightness of the seal will be even further enhanced due to such pressure forcing the parts more intimately together. Retaining ring 13, with glass seal 12 formed therein and terminal lead 7 embedded in the latter, is joined at its rim portion 13a to the adjacent wall portion of casing 2 by welding or soldering, or other suitable means which will ensure a strong, fluid-tight joint.

In accordance with the invention, glass material 12, retaining ring 13, and lead wire 7 have thermal expansion characteristics of particular relationship, as hereinafter described. It has been found that the novel glass composition mentioned above when applied in molten form in contact with the anodized tantalum lead wire, forms an intimate bond therewith when solidified in the presence of the tantalum oxide film thereon, and, having a coefficient of thermal expansion very close to that of tantalum, avoids the problems of differential expansion and contraction which in the past have made prior types of glass-metal seals for such capacitors unsatisfactory as truly hermetic seals, especially when subjected to severe operational conditions.

Glass 12 preferably has the composition, in percent by weight, of about 35% BaO, about 25% $Al_2O_3$, about 35–40% $B_2O_3$, and about 0–5% $CeO_2$. The $CeO_2$ is advantageously added in the indicated proportions to facilitate melting of the homogeneous glass material.

The glass material employed in accordance with the invention provides additional benefits by virtue of its superior resistance to chemical attack by both aqueous and non-aqueous electrolytes commonly used in the electrolytic capacitors.

The following are specific examples of compositions of the above glass which have proved satisfactory:

*Example 1*

| | Percent |
|---|---|
| BaO | 35 |
| $Al_2O_3$ | 25 |
| $B_2O_3$ | 40 |

*Example 2*

| | Percent |
|---|---|
| BaO | 35 |
| $Al_2O_3$ | 25 |
| $B_2O_3$ | 35 |
| $CeO_2$ | 5 |

The properties of the above glass materials are as follows:

| | Ex. 1 | Ex. 2 |
|---|---|---|
| Density (g./cc.) | 2.94 | 3.09 |
| Coefficient of thermal expansion (cm./cm./°C.) (0–300° C.) | $60 \times 10^{-7}$ | $61.7 \times 10^{-7}$ |
| Softening point (°C.) | 676 | 683 |

The aforementioned coefficients of thermal expansion of the glass material approximates very closely that of tantalum which is about $66 \times 10^{-7}$ cm./cm./° C.

Retaining ring 13, in accordance with the invention, is made of a metal having a coefficient of thermal expansion which is substantially equal to or greater than that of glass material 12. In a preferred embodiment, titanium is employed, this metal having a thermal expansion coefficient of about $85 \times 10^{-7}$ cm./cm./° C. The film-forming characteristics of this metal also make it desirable in view of the corrosion resistance which it thereby imparts to the metal. Other metals or alloys, however, such as an alloy of the 46% nickel-balance iron, stainless steel or other metals which have thermal expansions of $75–110 \times 10^{-7}$ cm./cm./° C. may be used if desired.

Casing 2 and retaining ring 13 preferably have the following combination of properties: reasonably comparable coefficients of thermal expansion, be weldable or solderable together, be made of film-forming metal, be compatible with electrolytes normally used in electrolytic capacitors, and be lightweight and corrosion resistant. Titanium eminently fulfills these requirements and is accordingly preferred for use for both the casing and the retaining ring. However, metals which may be employed for casing 2, in addition to those noted above for ring 13, are silver-plated copper, 46–51% nickel-iron, and nickel silver. While different ones of the aforementioned metals (or equivalents thereof) may be used for these parts, it is generally desirable that the same metal be used for both the retaining ring 13 and casing 2 so as to avoid corrosion resulting from galvanic action between dissimilar metals.

FIGURE 2 is a graph illustrating the relationship of the thermal expansion characteristics of the tantalum lead, glass seal and the titanium retaining ring combination preferably employed in the present invention. In the graph, the thermal expansion is plotted against the temperature in degrees centigrade, and the three curves shown represent the following: Curve A is the glass seal material, Curve B is the tantalum lead, and Curve C is the titanium retaining ring. As will be seen, the glass seal material and the tantalum lead have thermal expansion properties which closely match one another over a wide temperature range. The thermal expansion value of the titanium ring is somewhat higher, but is generally proportional to the rate of increase of thermal expansion of the other two components of the seal.

In a typical procedure for making the sealed capacitor of the invention, the retaining ring 13 is mounted with tapering surface 13b facing upwardly on a carbon fixture which has a central aperture and in which is positioned tantalum lead wire 7 formed with an anodic oxide film. The glass seal material in the form of an annular bead of compacted glass powder of the described composition is placed on surface 13b of retaining ring 13 with the lead wire 7 passing therethrough, and this assembly is heated in a vacuum-atmosphere furnace by initially raising the temperature to 650° C. under a vacuum of less than $10^{-4}$ mm. Hg pressure. This temperature is held for about fifteen minutes, and thereafter the vacuum is broken by introduction of dry argon. The temperature is then increased to 875° C., held for about ten minutes under an argon atmosphere pressure of 3 to 5 p.s.i. gage, and the parts are then cooled. With the capacitor section in rolled form and the anode and cathode tabs extending from opposite ends thereof, the anode tab (tantalum), which has been anodically film-formed, and the internal lead wire 7, which projects from the intimately bonded glass-metal seal, are welded together. The cathode tab is similarly connected to the internal lead wire of another glass-metal seal unit. This assembly of capacitor roll section and glass-metal seals is placed in a tubular titanium casing which has a fill hole in its wall, the titanium retaining rings are sealed to the casing end portions by heliarc welding, electrolyte solution is introduced into the casing through the fill hole, and the latter is sealed with a titanium plug by welding.

A series of comparative tests was made on two groups of tubular electrolytic capacitors containing an aqueous electrolyte of ethylene glycol and water and which were of otherwise identical construction except that one group comprised glass-metal hermetic seals of the invention, whereas the capacitors of the other groups were provided with an optimum known type of seal constituted by a combination of elastomer and Teflon discs. Test conditions of 85° C. and 50 volts D.-C. were applied to these units, and after 7000 hours, a weight loss of about 1 milligram was encountered with the units sealed in accordance with the invention, in contrast to the weight loss of over 30 milligrams suffered by the known type units. In other tests comparing capacitors with the two different types of seals using a higher temperature in the test conditions, even greater disparity in weight loss was found. Thus, under test conditions of 145° C. and 40 volts D.-C. after 3000 hours, the units of the present invention experienced an average weight loss of only 5 milligrams as compared to the control units which had an average loss of 488 milligrams.

In another series of tests using similar units of the present invention and similar control units, all units were subjected to test conditions of 125° C., 30 volts D.C. and in a vacuum of approximately $1\times10^6$ mm. of Hg. After 500 hours, the units of the present invention experienced an average weight loss of one milligram as compared to the control units which had an average loss of 38 milligrams. This is an accelerated test in that the pressure differential across the seal is increased by one atmosphere. The weight loss (permeation rate) is increased approximately 1.5 to 2 times for the non-hermetic seal control units, whereas it does not show an appreciable difference in the hermetic seal because of the low permeation rate.

Additional tests were applied to hermetically sealed tubular capacitors of the invention containing a tantalum foil roll and employing a special electrolyte forming the subject of co-pending application Serial No. 254,678, filed January 29, 1963, in the name of H. M. Stahr, and assigned to the same assignee as the present invention, and from these tests it was found that such units were capable of operation at the extremely high temperature level of 200° C. for over 5000 hours.

There is thus provided by the invention capacitors with a hermetic seal which provides superior retention of the fill electrolyte and virtually eliminates vapor transmission thereof over long periods of time and under severe operational conditions. By virtue of the particular glass seal material employed, an intimate permanent seal to a film-formed lead wire, which has not been heretofore satisfactorily obtained in prior art capacitors, is effectively achieved and thereby the escape of electrolyte along the capacitor lead wire is largely eliminated. The hermetic seal of the invention, furthermore, avoids the risk of contaminating external atmospheres by outgassing especially under vacuum conditions, and thus makes the described unit particularly adapted for use in outer space equipment.

Although the invention has been described principally with respect to electrolytic capacitors, it will be evident that the described seal construction may have application to other electrical devices where maintenance of a strong hermetic seal for the container of the electrical device is important.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. A hermetically sealed electrical assembly comprising, in combination, a casing containing an electrolyte and an electrical component immersed therein, said casing having a terminal lead extending outwardly through said opening and composed of a film-forming metal wire having a dielectric oxide film formed thereon, and a closure hermetically sealing said opening and electrically insulating said terminal lead from said casing, said closure comprising metal ring means joined to said casing and having glass material retained therein in fused sealing relation with said ring means and with said terminal lead passing therethrough, said glass material and said terminal lead having substantially matching coefficients of thermal expansion, and said ring means having a coefficient of thermal expansion at least substantially equal to that of said glass material, said glass material having the approximate composition of 35% BaO, 25% $Al_2O_3$, 35–40% $B_2O_3$, and 0–5% $CeO_2$.

2. A hermetically sealed electrical assembly comprising, in combination, a casing containing an electrolyte and an electrical component immersed therein, said casing having an opening therein and said electrical component having a terminal lead extending therefrom outwardly through said casing opening, said terminal lead composed of a film-forming metal having an anodic dielectric oxide film thereon, and a closure hermetically sealing said opening and electrically insulating said terminal lead from said casing, said closure comprising metal ring means joined to said casing and having glass material retained therein in fused sealing relation with said ring means and with said terminal lead passing therethrough, said glass material and said terminal lead having substantially matching coefficients of thermal expansion, said ring means having a coefficient of thermal expansion at least substantially equal to that of said glass material, said glass material having the approximate composition of 35% BaO, 25% $Al_2O_3$, 35–40% $B_2O_3$, and 0–5% $CeO_2$.

3. A hermetically sealed electrical capacitor comprising, in combination, a casing containing an electrolyte and a capacitor section immersed therein, said casing having an opening therein and said capacitor section having a terminal lead extending therefrom outwardly through said casing opening, said terminal lead composed of a film-forming metal having an anodic dielectric oxide film thereon, and a closure hermetically sealing said opening and electrically insulating said terminal lead from said casing, said closure comprising a ring member having a rim portion fitting within said opening and joined to said casing and having an outwardly tapering seal surface, and glass material retained in said ring member in fused sealing relation with said tapering surface thereof and with said terminal lead passing therethrough, said glass material and said terminal lead having substantially matching coefficients of thermal expansion and said ring member having a coefficient of thermal expansion at least substantially equal to that of said glass material, said glass material having the approximate composition of 35% BaO, 25% $Al_2O_3$, 35–40% $B_2O_3$, and 0–5% $CeO_2$.

4. A hermetically sealed electrical capacitor comprising, in combination, a casing containing an electrolyte and a capacitor section immersed therein, said casing having an opening therein and said capacitor section having a terminal lead extending therefrom outwardly through said casing opening, said terminal lead composed of tantalum having an anodic dielectric oxide film formed thereon, and a closure hermetically sealing said opening and electrically insulating said tantalum terminal lead from said casing, said closure comprising a titanium ring member having a rim portion sealed within said opening and joined to said casing and including a ring portion having an outwardly tapering seal surface, and a glass body retained in said ring member and completely surrounded thereby so as to be in fused sealing relation with said tapering surface and with said tantalum terminal lead passing therethrough, said glass body and said tantalum terminal lead having substantially matching coefficients of thermal expansion, and said ring member having a coefficient of thermal expansion being greater than but substantially equal to that of said glass body.

5. A hermetically sealed electrical capacitor comprising, in combination, a casing containing an electrolyte and a capacitor section immersed therein, said casing having an opening therein and said capacitor section having a terminal lead extending therefrom outwardly through said casing opening, said terminal lead composed of tantalum having an anodic dielectric oxide film thereon, and a closure hermetically sealing said opening and electrically insulating said tantalum terminal lead from said casing, said closure comprising a titanium ring member joined to said casing and having a glass material retained therein in fused sealing relation with said ring member and with said tantalum lead passing therethrough, said glass material having the approximate composition of 35% BaO, 25% $Al_2O_3$, 35-40% $B_2O_3$, and 0-5% $CeO_2$.

6. A closure for electrical devices comprising a metal ring member having extending therethrough a lead wire composed of a film-forming metal having a dielectric oxide film formed thereon, and a glass body filling the space between and fusion sealed to said lead wire and said metal ring member, said glass body and said lead wire having substantially matching coefficients of thermal expansion, said ring member having a coefficient of thermal expansion at least substantially equal to that of said glass body, said glass body having the approximate composition of 35% BaO, 25% $Al_2O_3$, 35-40% $B_2O_3$, and 0-5% $CeO_2$.

7. A closure for electrical devices comprising a metal ring member having extending therethrough a lead wire composed of tantalum having a dielectric oxide film formed thereon, and a glass body filling the space between and fusion sealed to said lead wire and said metal ring member, said glass body and said lead wire having substantially matching coefficients of thermal expansion, said ring member having a coefficient of thermal expansion at least substantially equal to that of said glass body, said glass body having the approximate composition of 35% BaO, 25% $Al_2O_3$, 35-40% $B_2O_3$, and 0-5% $CeO_2$.

8. A closure for electrical devices comprising a titanium ring member having extending therethrough a lead wire composed of tantalum having a dielectric oxide film formed thereon, and a glass body filling the space between and fusion sealed to said lead wire and said metal ring member, said glass body and said lead wire having substantially matching coefficients of thermal expansion, said ring member having a coefficient of thermal expansion at least substantially equal to that of said glass body, said glass body having the approximate composition of 35% BaO, 25% $Al_2O_3$, 35-40% $B_2O_3$, and 0-5% $CeO_2$.

9. A hermetically sealed electrical assembly comprising, in combination, a casing containing an electrolyte and an electrical component immersed therein, said casing having an opening and a terminal lead extending outwardly through said opening and composed of a film forming metal wire having a dielectric oxide film formed thereon, and a closure hermetically sealing said opening and electrically insulating said terminal lead from said casing, said closure comprising a metal ring member having a rim portion sealed within said opening and joined to said casing and including a ring portion having an outwardly tapering seal surface, and a glass body retained in said ring member and completely surrounded thereby so as to be in fused sealing relation with said tapering surface and with said terminal lead passing therethrough, said glass body and said terminal lead having substantially matching coefficients of thermal expansion, and said ring member having a coefficient of thermal expansion greater than but substantially equal to that of said glass body.

References Cited by the Examiner

UNITED STATES PATENTS

| | | | |
|---|---|---|---|
| 2,307,561 | 1/1943 | Bailey | 317—230 |
| 2,812,466 | 11/1957 | Murdock | 313—217 |
| 2,907,933 | 10/1959 | Nazzewski | 317—230 |
| 3,131,337 | 4/1964 | Clement | 317—230 |

J. D. KALLAM, *Assistant Examiner.*

JOHN W. HUCKERT, *Primary Examiner.*